(12) United States Patent
Lee et al.

(10) Patent No.: US 12,494,531 B2
(45) Date of Patent: Dec. 9, 2025

(54) SHEET-SHAPED ANODE FED-TYPE METAL-CARBON DIOXIDE BATTERY AND HYDROGEN GENERATION AND CARBON DIOXIDE STORAGE SYSTEM INCLUDING THE SAME

(71) Applicants: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

(72) Inventors: Yun Su Lee, Uiwang-si (KR); Ji Hoon Jang, Suwon-si (KR); Dongil Lee, Goyang-si (KR); Yongsung Jo, Seoul (KR)

(73) Assignees: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 313 days.

(21) Appl. No.: 18/086,363

(22) Filed: Dec. 21, 2022

(65) Prior Publication Data

US 2023/0387511 A1 Nov. 30, 2023

(30) Foreign Application Priority Data

May 26, 2022 (KR) .................. 10-2022-0064407

(51) Int. Cl.
*H01M 12/08* (2006.01)
*H01M 12/02* (2006.01)
(Continued)

(52) U.S. Cl.
CPC ........... *H01M 12/08* (2013.01); *H01M 12/02* (2013.01); *H01M 50/1385* (2021.01);
(Continued)

(58) Field of Classification Search
CPC .. H01M 12/02; H01M 12/08; H01M 50/1385; H01M 50/46; H01M 50/1537;
(Continued)

(56) References Cited

U.S. PATENT DOCUMENTS 5,879,522 A * 3/1999 Shaaban .................. C25B 9/70
204/290.01
6,841,047 B2 1/2005 Gestermann et al.
(Continued)

FOREIGN PATENT DOCUMENTS

KR 20040030924 A 4/2004
KR 101955696 B1 3/2019
(Continued)

OTHER PUBLICATIONS

KR101955696B1. Mar. 7, 2019. English machine translation by EPO. (Year: 2019).*
(Continued)

*Primary Examiner* — James Lee
(74) *Attorney, Agent, or Firm* — Lempia Summerfield Katz LLC

(57) ABSTRACT

A metal-carbon dioxide battery and a hydrogen generation and carbon dioxide storage system including the same are disclosed. The metal-carbon dioxide battery includes: a first plate with a designated area; a second plate with a designated area and spaced apart from the first plate by a distance in an X-axis direction; a separator between the first and second plates; a frame-shaped spacer disposed between the first plate and the separator with a space between the first plate and the separator; a plurality of anode sheets in the space; a pressing unit in the space between the first plate and the anode sheets and biasing the anode sheets toward the separator; and a cathode between the second plate and the separator.

19 Claims, 9 Drawing Sheets

(51) Int. Cl.
*H01M 50/138* (2021.01)
*H01M 50/148* (2021.01)
*H01M 50/46* (2021.01)

(52) U.S. Cl.
CPC ....... *H01M 50/1537* (2021.01); *H01M 50/46* (2021.01); *H01M 2300/0014* (2013.01)

(58) Field of Classification Search
CPC ......... H01M 2300/0014; H01M 10/36; H01M 14/00; H01M 16/006
See application file for complete search history.

(56) References Cited

U.S. PATENT DOCUMENTS

| 2003/0047446 A1 | 3/2003 | Gestermann et al. |
| 2021/0348286 A1 | 11/2021 | Bulan |

FOREIGN PATENT DOCUMENTS

| KR | 20210060468 A | 5/2021 |
| KR | 102279080 B1 | 7/2021 |

OTHER PUBLICATIONS

Shuyu Liang, et al., Electrolytic cell design for electrochemical CO2 reduction, Journal of CO2 Utilization; vol. 35, Jan. 2020; https://doi.org/10.1016/j.jcou.2019.09.007; 16 pp.

\* cited by examiner

SHEET-SHAPED ANODE FED-TYPE METAL-CARBON DIOXIDE BATTERY AND HYDROGEN GENERATION AND CARBON DIOXIDE STORAGE SYSTEM INCLUDING THE SAME

CROSS-REFERENCE TO RELATED APPLICATION

This application claims under 35 U.S.C. § 119(a) the benefit of priority to Korean Patent Application No. 10-2022-0064407 filed on May 26, 2022, the entire contents of which are incorporated herein by reference.

BACKGROUND

(a) Technical Field

The present disclosure relates to a metal-carbon dioxide battery and a hydrogen generation and carbon dioxide storage system including the same.

(b) Background Art

Recently, research on electrochemical water electrolysis is being actively conducted so as to keep up with development of renewable energy to cope with climate change. Further, the importance of carbon dioxide ($CO_2$) collection, storage, and conversion technologies for reduction of greenhouse gases is growing.

A zinc/aluminum (Zn/Al)-based aqueous battery system is a very economical metal anode candidate in terms of expenditure and reserves. The zinc/aluminum (Zn/Al)-based aqueous battery system is a system which produces hydrogen and simultaneously collects carbon dioxide in the form of a salt, such as potassium bicarbonate ($KHCO_3$).

SUMMARY OF THE DISCLOSURE

The present disclosure has been made in an effort to solve the above-described problems associated with the prior art. It is an object of the present disclosure to provide a metal-carbon dioxide battery, which has a low cell resistance and thus has greatly increased efficiency.

It is another object of the present disclosure to provide a metal-carbon dioxide battery to which anodes may be continuously fed without disassembling the metal-carbon dioxide battery.

It is yet another object of the present disclosure to provide a metal-carbon dioxide battery, which is spontaneously driven even when seawater is used as electrolytes of a cathode and an anode.

In one aspect, the present disclosure provides a metal-carbon dioxide battery including: a first plate having a designated area; a second plate having a designated area and located to be spaced apart from the first plate by a designated distance in an X-axis direction; a separator located between the first plate and the second plate; a frame-shaped spacer having a through hole formed through a center thereof located between the first plate and the separator and configured to form a space between the first plate and the separator; a plurality of anode sheets received in the space; a pressing unit received in the space installed between the first plate and the anode sheets and configured to provide pressing force so as to move the anode sheets towards the separator; and a cathode located between the second plate and the separator.

In an embodiment, the metal-carbon dioxide battery may further include a frame-type first gasket located between the first plate and the spacer. The first gasket may have a designated thickness and a through hole formed through a center of the first gasket. The space between the first plate and the separator may extend by a thickness of the first gasket.

In another embodiment, the spacer may include: a first electrolyte inlet located in a lower portion of one side surface of the spacer so that a first electrolyte is introduced thereinto; a first electrolyte outlet located in an upper portion of the one side surface of the spacer so that the first electrolyte is discharged therefrom; a first horizontal flow path configured to extend from the first electrolyte inlet to one edge part of the spacer in a Y-axis direction; a second horizontal flow path configured to extend from the first electrolyte outlet to the one edge part of the spacer in the Y-axis direction; a vertical flow path configured to connect one end of the first horizontal flow path to one end of the second horizontal flow path; first supply flow paths formed through some portions of the first horizontal flow path in a Z-axis direction so as to be directed towards a central portion of the spacer; and second supply flow paths formed through some portions of the second horizontal flow path in the Z-axis direction so as to be directed towards the central portion of the spacer.

In another embodiment, the spacer may include an opening formed in some regions of an upper portion thereof so as to accommodate the anode sheets.

In another embodiment, the metal-carbon dioxide battery may further include a lid installed to be detachably attached to the opening.

In another embodiment, the anode sheets may be stacked in the X-axis direction and received in the space.

In another embodiment, a thickness ratio of the anode sheets to the spacer may be in a range of 0.025:1 to 0.5:1.

In another embodiment, the anode sheets may be made from zinc (Zn), aluminum (Al), magnesium (Mg), or any combination thereof.

In another embodiment, the pressing unit may include a support plate configured to press the anode sheets and elastic members provided between the support plate and the first plate. The elastic members may be configured to provide elastic force to the support plate.

In another embodiment, the pressing unit may include a support plate configured to press the anode sheets and may include a fluid received in a gap between the support plate and the first plate. The first plate may include a fluid inlet formed therethrough in the X-axis direction so as to communicate with the gap. The metal-carbon dioxide battery may further include a fluid supplier configured to supply the fluid to the gap through the fluid inlet so as to provide fluid pressure to the support plate.

In another embodiment, the metal-carbon dioxide battery may further include a plate-shaped porous protective film located between the anode sheets and the separator.

In another embodiment, the cathode may be made from carbon paper, carbon fiber, carbon felt, carbon fabric, metal foam, a thin metal film, or any and combination thereof.

In another embodiment, the cathode may include a precious metal catalyst supported on a support.

In another embodiment, the second plate may include: a body part having a shape of a plate; a protrusion part configured to protrude from a central portion of one surface of the body part so as to have an area equal to or smaller than an area of the cathode; a second electrolyte inlet formed in the protrusion part 220 so as to penetrate the protrusion part and the body part; a second electrolyte outlet spaced apart from the second electrolyte inlet by a designated distance and formed in the protrusion part so as to penetrate the protrusion part and the body part; and a second electrolyte flow path depressed from a surface of the protrusion part and provided with one end configured to communicate with the second electrolyte inlet and a remaining end configured to communicate with the second electrolyte outlet.

In another embodiment, the cathode may come into direct contact with the protrusion part.

In another embodiment, the metal-carbon dioxide battery may further include a second gasket disposed on an outer circumferential surface of the protrusion part.

In another aspect, the present disclosure provides a hydrogen generation and carbon dioxide storage system. The system includes: a metal-carbon dioxide battery configured to generate hydrogen using carbon dioxide as fuel; a first electrolyte supplier configured to supply a first electrolyte to the metal-carbon dioxide battery; a second electrolyte supplier configured to supply a second electrolyte and the carbon dioxide to the metal-carbon dioxide battery; and a separation unit connected to a second electrolyte outlet of the metal-carbon dioxide battery. The separation unit is configured to receive products of the metal-carbon dioxide battery, to separate hydrogen gas from the products, and to recover carbon dioxide stored in a form of a salt.

In another embodiment, the first electrolyte may include an aqueous alkaline solution or seawater.

In another embodiment, the second electrolyte may include an aqueous alkaline solution or seawater.

Other aspects and embodiments of the disclosure are discussed below.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
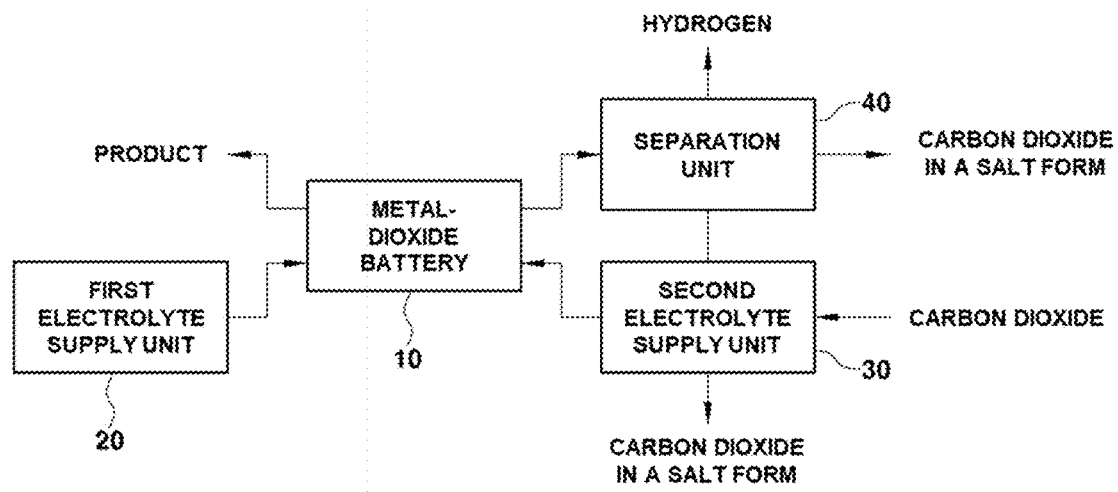
FIG. 1 is a block diagram schematically showing a hydrogen generation and carbon dioxide storage system according to the present disclosure.

It should be understood that the appended drawings are not necessarily to scale, presenting a somewhat simplified representation of various features illustrative of the basic principles of the disclosure. The specific design features of the inventive concept of the present disclosure as disclosed herein, including, for example, specific dimensions, orientations, locations, and shapes, will be determined in part by the particular intended application and use environment.

In the figures, the same reference numbers refer to the same or equivalent parts of the present disclosure throughout the several figures of the drawing.

DETAILED DESCRIPTION

The above-described objects, other objects, advantages, and features of the present disclosure should become apparent from the descriptions of embodiments given hereinbelow with reference to the accompanying drawings. However, the present disclosure is not limited to the embodiments disclosed herein and may be implemented in various forms. The embodiments are provided to make the description of the present disclosure thorough and to fully convey the scope of the present disclosure to those having ordinary skill in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms such as "first" and "second" may be used to describe various elements but do not limit the elements. These terms are used only to distinguish one element from other elements. For example, a first element may be named a second element and, similarly, a second element may be named a first element, without departing from the scope and spirit of the disclosure. Singular expressions may encompass plural expressions unless they have clearly different contextual meanings.

In the following description of the embodiments, terms, such as "including," "comprising," and "having," and variations thereof, are to be interpreted as indicating the presence of characteristics, numbers, steps, operations, elements, or parts stated in the description or combinations thereof. Such terms do not exclude the presence of one or more other characteristics, numbers, steps, operations, elements, parts, or combinations thereof, or possibility of adding the same. In addition, it should be understood that, when a part, such as a layer, a film, a region, or a plate, is said to be "on" another part, the part may be located "directly on" the other part or other parts may be interposed between the two parts. In the same manner, it should be understood that, when a part, such as a layer, a film, a region, or a plate, is said to be "under" another part, the part may be located "directly under" the other part or other parts may be interposed between the two parts.

All numbers, values, and/or expressions representing amounts of components, reaction conditions, polymer compositions, and blends used in the description are approximations in which various uncertainties in measurement generated when these values are acquired from essentially different things are reflected. Thus, it should be understood that such numbers, values, and/or expressions are modified by the term "about," unless stated otherwise. In addition, it should be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

FIG. 1 is a block diagram schematically showing a hydrogen generation and carbon dioxide storage system according to the present disclosure. Referring to this figure, the system may include: a metal-carbon dioxide battery 10; a first electrolyte supplier 20 connected to the metal-carbon dioxide battery 10 and configured to supply a first electrolyte to the metal-carbon dioxide battery 10; a second electrolyte supplier 30 connected to the metal-carbon dioxide battery 10 and configured to supply a second electrolyte and carbon dioxide to the metal-carbon dioxide battery 10; and a separation unit 40 connected to the metal-carbon dioxide battery 10. The separation unit 40 may be configured to receive products, to separate hydrogen gas and carbon dioxide in the form of a salt from the products and to recover the carbon dioxide.

Korean Patent Application No. 10-2021-0136204, filed by the inventors of the present disclosure, is technically significant in that the resistance of a battery is lowered by greatly reducing the distance between a cathode and an anode. However, in the above earlier application, since zinc foil, aluminum foil, or the like is used as the anode, when the anode is consumed, the battery needs to be disassembled so that a new anode can be mounted therein.

The present disclosure relates to a metal-carbon dioxide battery to which anodes may be continuously fed without disassembling the battery.

Figure 2:
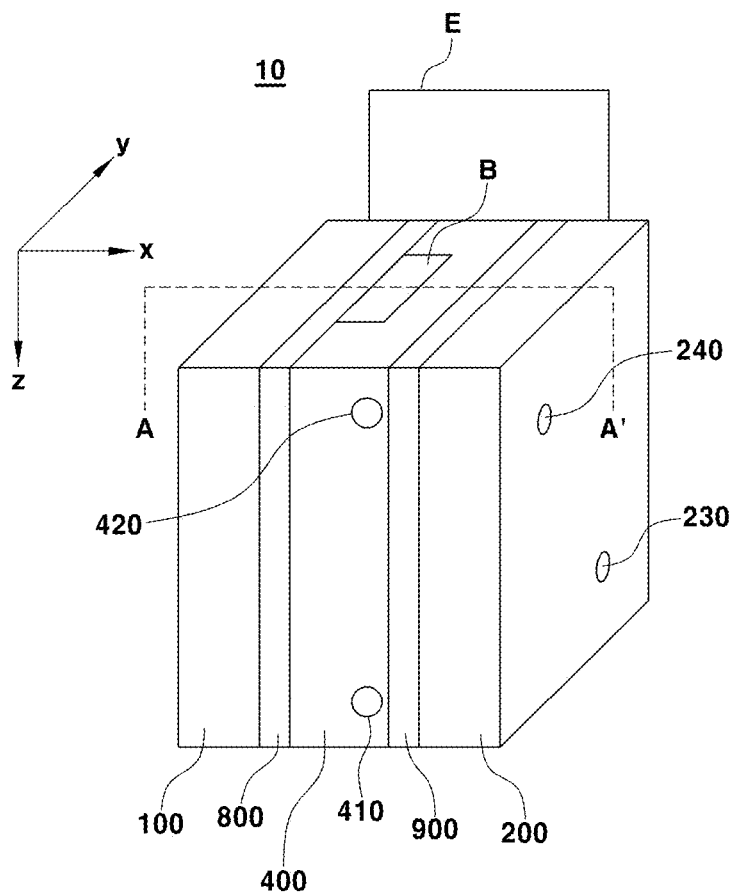
FIG. 2 is a perspective view of a metal-carbon dioxide battery according to the present disclosure.
Figure 3:
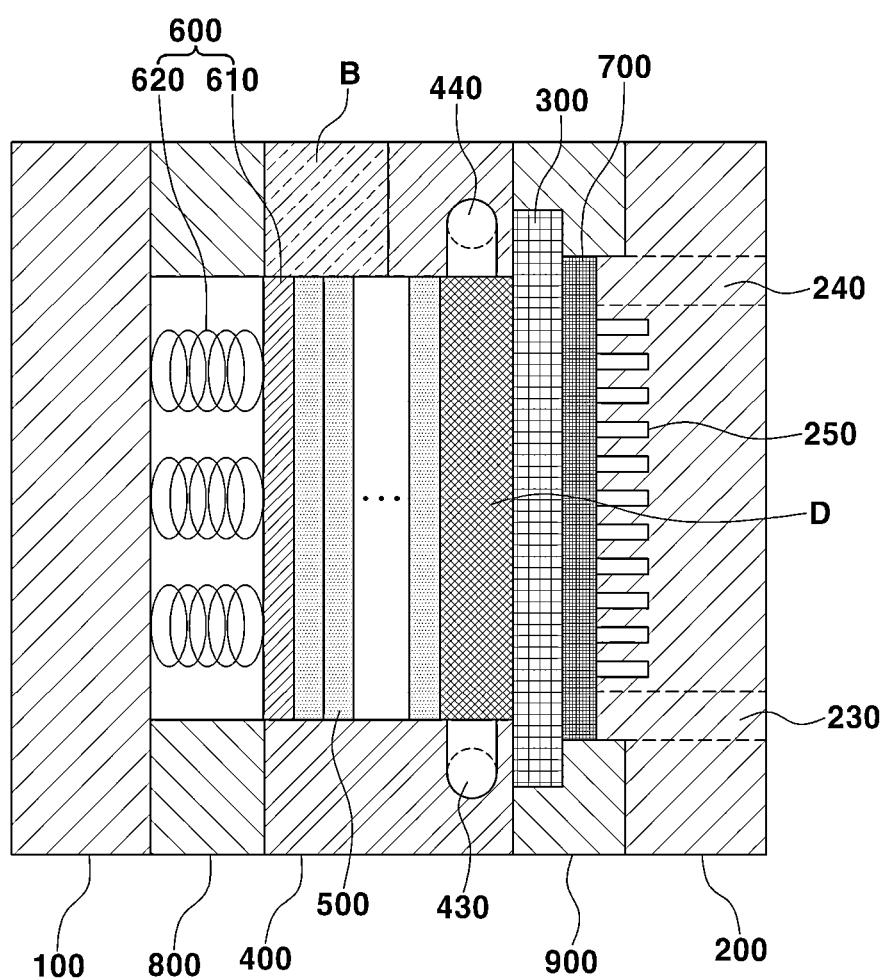
FIG. 3 is a cross-sectional view taken along line A-A' of FIG. 2.

FIG. 2 is a perspective view of the metal-carbon dioxide battery 10 according to the present disclosure. In the following description, an X-axis direction, a Y-axis direction, and a Z-axis direction should be interpreted based on a coordinate system shown in FIG. 2. FIG. 3 is a cross-sectional view taken along line A-A' of FIG. 2. Referring to these figures, the metal-carbon dioxide battery 10 may include: a plate-shaped first plate 100 having a designated area; a plate-shaped second plate 200 having a designated area and located to be spaced apart from the first plate 100 by a designated distance in the X-axis direction; a separator 300 located between the first plate 100 and the second plate 200; a spacer 400 located between the first plate 100 and the separator 300 and configured to form a space between the first plate 100 and the separator 300; a plurality of anode sheets 500 received in the space; a pressing unit 600 received in the space, installed between the first plate 100 and the anode sheets 500, and configured to provide pressing force so as to move or bias the anode sheets 500 toward the separator 300; and a cathode 700 located between the second plate 200 and the separator 300. The first plate 100 serves to collect current and may be conductive. Electrons generated due to an oxidation reaction of the anode sheets 500 may migrate to the first plate 100 through the conductive pressing unit 600, and thus may be collected by the first plate 100.

The first plate 100 and the second plate 200 may be connected by a conductive wire E. Therefore, the electrons collected by the first plate 10 may migrate to the second plate 200 through the conductive wire E.

The metal-carbon dioxide battery 10 may further include a frame-shaped first gasket 800 located between the first plate 100 and the spacer 400. The first gasket 800 may have a designated thickness and a through hole formed through the center of the first gasket 800. Thereby, the space between the first plate 100 and the separator 300 may extend by the thickness of the first gasket 800. Consequently, a larger number of the anode sheets 500 may be accommodated in the space.

The first gasket 800 may be formed of a material which is unbreakable and chemically stable. For example, the first gasket 800 may include a fluoropolymer, such as Teflon™.

The thickness of the first gasket 800 may be in a range of 1 millimeter (mm) to 20 mm, in a range of 5 mm to 20 mm, in a range of 10 mm to 20 mm, or the like. When the thickness of the first gasket 800 is less than 1 mm, the extension effect of the space may be insignificant. When the thickness of the first gasket 800 exceeds 20 mm, the volume of the metal-carbon dioxide battery 10 may be excessively increased.

Figure 4:
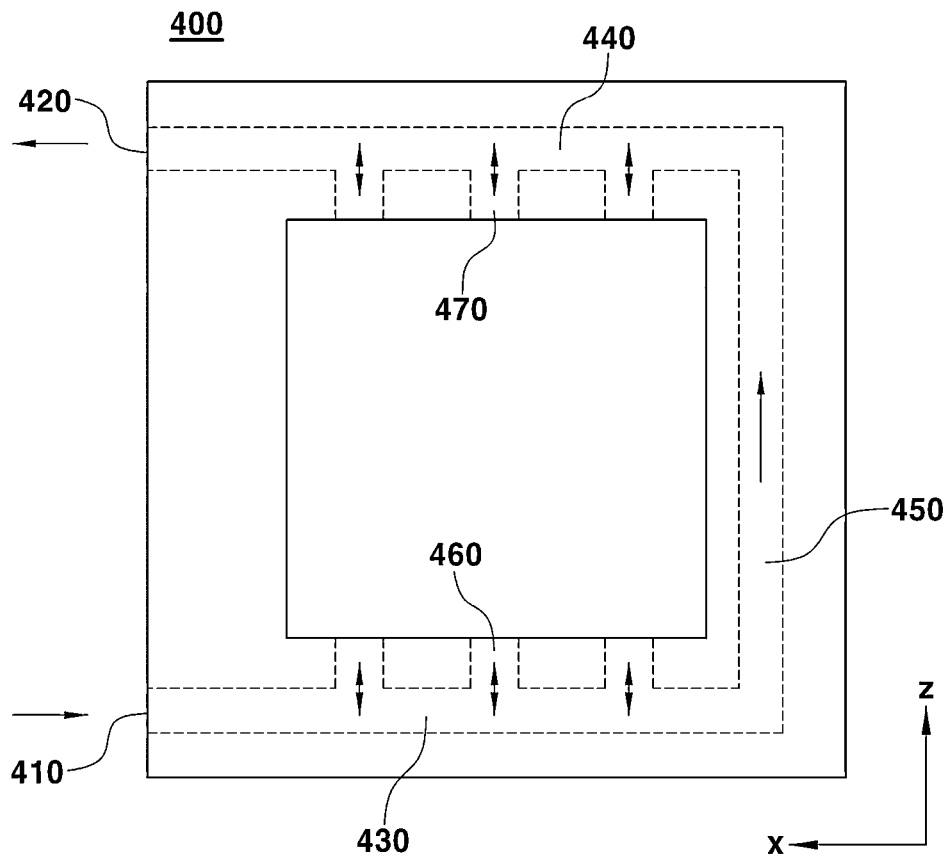
FIG. 4 is a plan view showing one surface of a spacer.
Figure 5:
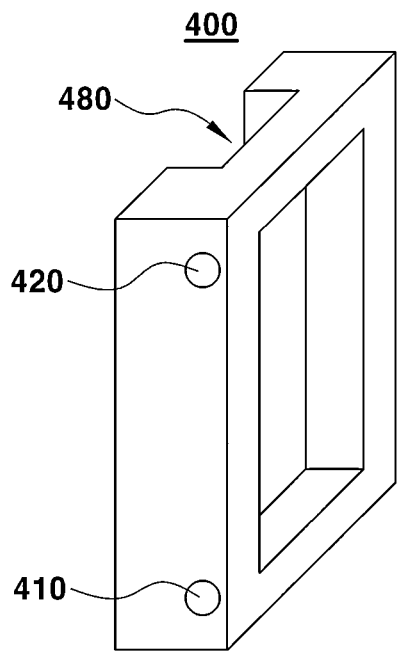
FIG. 5 is a perspective view showing the spacer.

FIG. 4 is a plan view showing one surface of the spacer 400. FIG. 5 is a perspective view showing the spacer 400.

Referring to FIGS. 2-4, the spacer 400 may be formed in a frame type having a through hole formed through the center thereof.

The spacer 400 may include: a first electrolyte inlet 410 located in the lower portion of one side surface of the spacer 400 so that the first electrolyte is introduced thereinto; a first electrolyte outlet 420 located in the upper portion of the one side surface of the spacer 400 so that the first electrolyte is discharged therefrom; a first horizontal flow path 420 configured to extend from the first electrolyte inlet 410 to one edge part of the spacer 400 in the Y-axis direction; a second horizontal flow path 430 configured to extend from the first electrolyte outlet 420 to the one edge part of the spacer 400 in the Y-axis direction; a vertical flow path 450 configured to connect one end of the first horizontal flow path 430 to one end of the second horizontal flow path 440; first supply flow paths 460 formed through some portions of the first horizontal flow path 430 in the Z-axis direction so as to be directed towards the central portion of the spacer 400; and second supply flow paths 470 formed through some portions of the second horizontal flow path 440 in the Z-axis direction so as to be directed towards the central portion of the spacer 400.

The first electrolyte is provided to the spacer 400 through the first electrolyte inlet 410. The first electrolyte flows through the first horizontal flow path 430. Here, the first electrolyte may be provided to the space between the first plate 100 and the separator 300 through the first supply flow paths 460. Further, the first electrolyte filling the space may be discharged to the first horizontal flow path 430 through the first supply flow paths 460.

The first electrolyte flowing through the first horizontal flow path 430 is provided to the second horizontal flow path 440 through the vertical flow path 450. The first electrolyte may be provided to the space between the first plate 100 and the separator 300 through the second supply flow paths 470. Further, the first electrolyte filling the space may be discharged to the second horizontal flow path 440 through the second supply flow paths 470.

Supply and discharge of the first electrolyte to and from the space may be adjusted by the flow rate of the first electrolyte supplied from the first electrolyte supplier 20 depending on a pressure difference between the space and the outside. The first electrolyte supplier 20 further is described below.

The thickness of the spacer 400 may be in a range of 1 mm to 20 mm, in a range of 5 mm to 20 mm, in a range of 10 mm to 20 mm, or the like. When the thickness of the spacer 400 is less than 1 mm, the space between the first plate 100 and the separator 300 is excessively narrow, and thus may not accommodate the anode sheets 500 and the pressing unit 600.

Referring to FIG. 5, the spacer 400 may include an opening 480 formed in some regions of the upper portion of the spacer 400. A new anode sheet 500 may be fed to the space between the first plate 100 and the separator 300 through the opening 480. In other words, a new anode may be continuously fed to the metal-carbon dioxide battery 10 according to the present disclosure without disassembling the metal-carbon dioxide battery 10. This is contrary to the conventional metal-carbon dioxide batteries.

Feeding of the new anode sheet 500 is not limited to a specific method. For example, the new anode sheet 500 may be fed by widening the gap between the existing anode sheets 500 and a support plate 610 using a lever or the like.

The metal-carbon dioxide battery 10 may further include a lid B installed to be detachably attached to the opening 480.

The lid B is not limited to a specific size as long as the lid B is capable of completely closing the opening 480 so as to cut off the space from the outside. The lid B may be formed of a material having no reactivity with the electrolyte and the anode sheets 500.

The plurality of anode sheets 500 may be stacked in the X-axis direction and may be received in the space between the first plate 100 and the separator 300.

The anode sheets 500 are not limited to a specific number. The anode sheets 500 may be provided in a number, which fills 50% by volume or more, 60% by volume or more, 70% by volume or more, 80% by volume or more, 90% by volume or more, or 100% by volume of the space.

The thickness ratio of the anode sheets 500 to the spacer 400 may be in a range of 0.025:1 to 0.5:1. When the thickness of the anode sheets 500 is excessively small (i.e., smaller than a ratio of 0.025:1), it is difficult to handle the anode sheets 500, the gap between the anode sheets 500 is increased, and thus the resistance of the metal-carbon dioxide battery 10 may be increased. On the contrary, when the thickness of the anode sheets 500 is excessively large (i.e., larger than a ratio of 0.5:1), it may be difficult to feed a new anode sheet 500 at a proper point in time. The thickness of the anode sheets 500 does not indicate the total thickness of the stack of the anode sheets 500 but indicates the thickness of one anode sheet 500.

The thickness of the anode sheets 500 may be properly adjusted in consideration of the thickness of the spacer 400 and the thickness ratio of the anode sheets 500 to the spacer 400. For example, the thickness of the anode sheets 500 may be 0.25 mm to 5 mm.

The anode sheets 500 may be made from a material such as zinc (Zn), aluminum (Al), magnesium (Mg), or any combination thereof.

The pressing unit 600 presses the anode sheets 500 toward the separator 300 so as to consume the plurality of the anode sheets 500 sequentially from the anode sheet 500 closest to the separator 300.

FIG. 3 shows a first embodiment of the pressing unit 600. Referring to this figure, the pressing unit 600 may include the support plate 610 configured to press the anode sheets 500. The pressing unit 600 may also include elastic members 620 provided between the support plate 610 and the first plate 100 and configured to provide elastic force to the support plate 610.

When one of the anode sheets 500 closest to the separator 300 is consumed by the reaction, the support plate 610 presses the anode sheets 500 in the X-axis direction by the elastic force of the elastic members 620. Therefore, the anode sheets 50 may be located to come into close contact with the separator 300.

The support plate 610 and the elastic members 620 may be formed of a material having electron conductivity. Therefore, electrons generated due to ionization of the anode sheet 500 may migrate to the first plate 100 through the support plate 610 and the elastic members 620 and may be collected.

Figure 6:
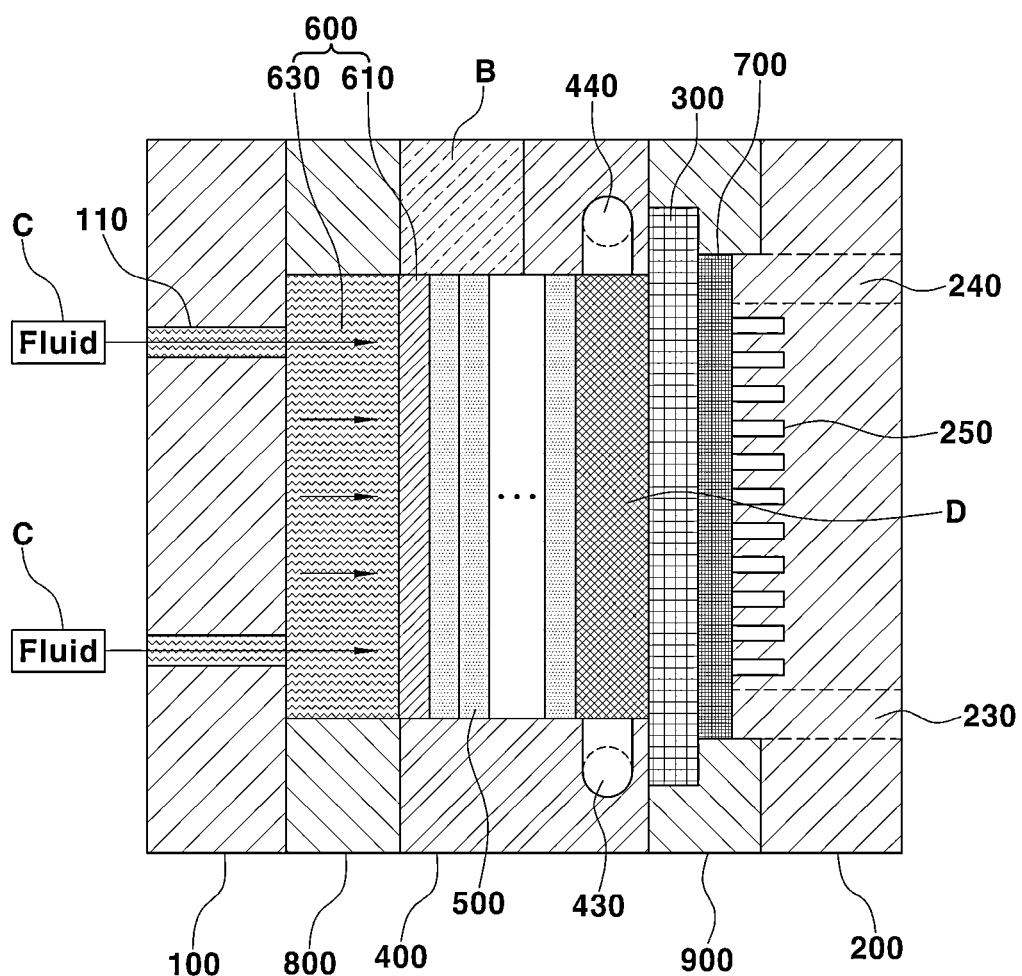
FIG. 6 is a view showing a second embodiment of a pressing unit.

FIG. 6 shows a second embodiment of the pressing unit 600. Referring to this figure, the pressing unit 600 may include the support plate 610 configured to press the anode sheets 500 and may include a fluid 630 received in a gap between the support plate 610 and the first plate 100.

The first plate 100 may include fluid inlets 110 formed through the first plate 100 in the X-axis direction so as to communicate with the gap. The metal-carbon dioxide battery 10 may further include fluid suppliers C configured to supply the fluid 630 to the gap through the fluid inlets 110 so as to provide fluid pressure to the support plate 610.

When one of the anode sheets 500 closest to the separator 300 is consumed by the reaction, the support plate 610 presses the anode sheets 500 in the X-axis direction by the fluid suppliers C and the fluid pressure of the fluid 630 provided thereby. Therefore, the anode sheets 50 may be located to come into close contact with the separator 300.

The support plate 610 and the fluid 630 may be formed of a material having electron conductivity. For example, the fluid 630 may include water, a metal solution, or the like. Therefore, electrons generated due to ionization of the anode sheet 500 may migrate to the first plate 100 through the support plate 610 and the fluid 630 and may be collected.

The metal-carbon dioxide battery 10 may further include a protective film D located between the anode sheets 500 and the separator 300. The protective film D may be installed to come into direct contact with the separator 300.

The protective film D serves to prevent the separator 300 from being damaged due to contact between the anode sheets 500 and the separator 300.

The protective film D may have a size sufficient to cover the entirety of the area of the separator 300 having possibility of contacting the anode sheet 500.

The protective film D may be formed of a material having chemical resistance such as rubber, a resin, silicon, a metal, or the like.

The protective film D may be porous. Therefore, the protective film D may be impregnated with the first electrolyte so that cations (K+) in the first electrolyte migrate to the cathode 700 through the separator 300.

The separator 300 may have a porous structure and may allow migration of cations and block movement of the electrolyte between the anode sheets 500 and the cathode 700.

The separator 300 may include a cationic conductive resin. For example, the separator 30 may include a perfluorinated sulfonic acid-based resin, such as Nation™.

The thickness of the separator 300 may be in a range of 25 micrometers (μm) to 250 micrometers (μm).

The cathode 700 may be formed from a material such as carbon paper, carbon fiber, carbon felt, carbon fabric, metal foam, a thin metal film, or any combination thereof. The cathode may instead include a catalyst. The catalyst may include a precious metal catalyst, such as platinum (Pt), supported on a support.

Figure 7:
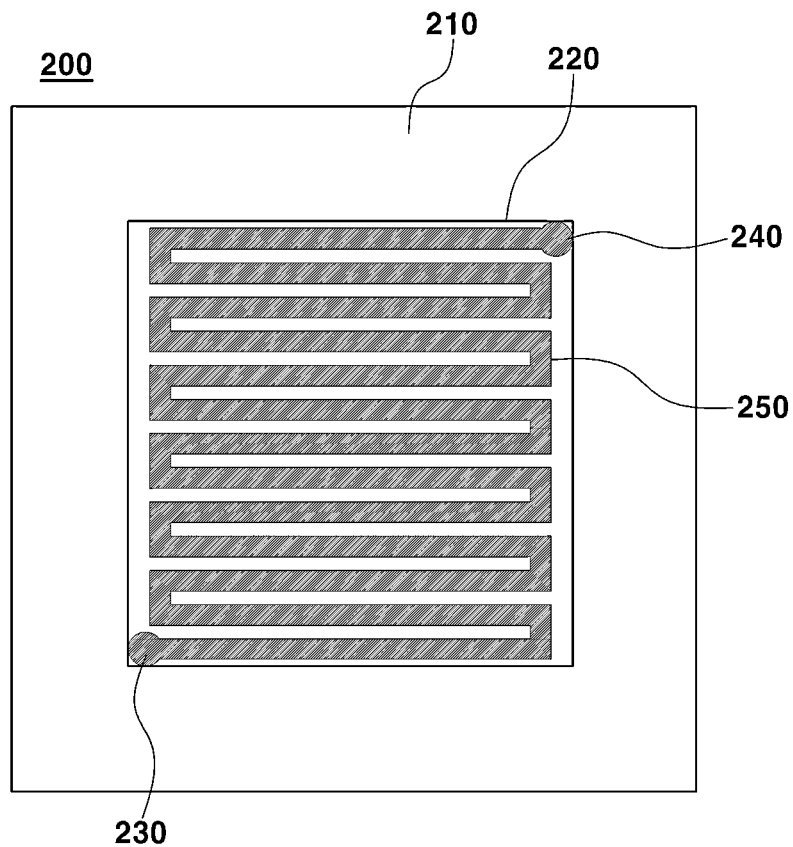
FIG. 7 is a plan view showing one surface of a second plate.

FIG. 7 is a plan view showing one surface of the second plate 200. The second plate 200 may include: a plate-shaped body part 210; a protrusion part 220 configured to protrude from the central portion of one surface of the body part 210 so as to have a designated area; a second electrolyte inlet 230 formed in the protrusion part 220 so as to penetrate the protrusion part 220 and the body part 210; a second electrolyte outlet 240 spaced apart from the second electrolyte inlet 230 by a designated distance and formed in the protrusion part 220 so as to penetrate the protrusion part 220 and the body part 210; and a second electrolyte flow path 250 provided with one end configured to communicate with the second electrolyte inlet 230 and the other end configured to communicate with the second electrolyte outlet 240.

The second plate 200 serves to collect current and may be conductive. Therefore, the second plate 200 may receive electrons from the first plate 100 through the conductive wire E and may transmit the electrons to the cathode 700. In other words, the metal-carbon dioxide battery 10 may have a structure in which electrons may migrate without any additional elements, such as a tab.

The second electrolyte inlet 230 may be formed through one edge part of the protrusion part 220 and the second electrolyte outlet 240 may be formed through another edge part of the protrusion part 220 symmetrical to the second electrolyte inlet 230 with respect to the central point of the protrusion part 220.

The cathode 700 may come into direct contact with the protrusion part 220.

The second electrolyte introduced into the second plate 200 through the second electrolyte inlet 230 may flow to the second electrolyte outlet 240 through the second electrolyte flow path 250, and the second electrolyte may be provided to the cathode 700 during such a process. In order to diffuse the second electrolyte, a mesh or foam formed of a metal may be provided between the cathode 700 and the protrusion part 220.

The second electrolyte flow path 250 may be depressed to a designated depth from the surface of the protrusion part 220. The second electrolyte flow path 250 is not limited to a specific shape and may be formed in a zigzag pattern, as shown in FIG. 7.

The metal-carbon dioxide battery 10 may further include a second gasket 900 disposed on the outer circumferential surface of the protrusion part 220. The second gasket 900 serves to prevent occurrence of a short-circuit of the metal-carbon dioxide battery 10.

The second gasket 900 is formed in a frame-shape having a through hole formed through the center thereof. Further, the second gasket 900 may surround the side surfaces of the separator 300 and the cathode 700 so as to prevent the separator 300 and the cathode 700 from being exposed to the outside.

The second gasket 900 may be formed of a material which is unbreakable and chemically stable. For example, the second gasket 900 may include a fluoropolymer, such as Teflon™.

Hereinafter, a method for driving the hydrogen generation and carbon dioxide storage system is described in detail.

The first electrolyte supplier 20 supplies the first electrolyte to the metal-carbon dioxide battery 10 through the first electrolyte inlet 410.

The first electrolyte may include an aqueous alkaline solution or seawater. The first electrolyte may include a 6M potassium hydroxide (KOH) solution.

The first electrolyte is introduced into the space between the first plate 100 and the separator 300 through the first electrolyte inlet 410.

When the anode sheet 500 comes into contact with the first electrolyte, the anode sheet 500 is ionized, thus generating electrons. The electrons migrate to the first plate 100 through the pressing unit 600. The electrons migrate from the first plate 100 to the second plate 200 through the conductive wire E and are transmitted to the cathode 700.

Cations ($K^+$), generated during the ionization process of the anode sheet 500 migrate to the cathode 700 through the separator 300.

The second electrolyte supplier 30 supplies the second electrolyte and carbon dioxide to the metal-carbon dioxide battery 10 through the second electrolyte inlet 230. The system may further include a carbon dioxide supply apparatus configured to supply carbon dioxide to the second electrolyte supplier 30.

The second electrolyte may include an aqueous alkaline solution or seawater. The second electrolyte may include a 3M potassium bicarbonate ($KHCO_3$) solution.

The second electrolyte and carbon dioxide are supplied to the cathode 700 through the second electrolyte inlet 230. The chemical elution reaction of carbon dioxide, which is described below, occurs on the cathode 700.

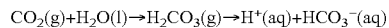

$$CO_2(g)+H_2O(l)\rightarrow H_2CO_3(g)\rightarrow H^+(aq)+HCO_3^-(aq)$$

Thereafter, the hydrogen evolution reaction, which is described below, occurs on the cathode 700.

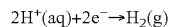

$$2H^+(aq)+2e^-\rightarrow H_2(g)$$

Further, carbon dioxide is stored in the form of a salt, as below.

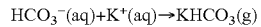

$$HCO_3^-(aq)+K^+(aq)\rightarrow KHCO_3(g)$$

Hydrogen ($H_2$) and $KHCO_3$ together with the second electrolyte are discharged to the outside of the battery 10 through the second electrolyte outlet 240.

The separation unit 40 may receive these products and may separate hydrogen from the products. For this purpose, the separation unit 40 may include a gas-liquid separator. Further, the separation unit 40 may have a filter configured to recover $KHCO_3$ from a liquid component.

The separation unit 40 may resupply the second electrolyte to the second electrolyte supplier 30. The second electrolyte supplier 30 may include a filtering member, such as a filter, configured to recover $KHCO_3$, which is not filtered out, from the second electrolyte provided by the separation unit 40.

Hereinafter, the present disclosure is described in more detail through the following examples. The following examples serve merely to exemplify the present disclosure and are not intended to limit the scope of the disclosure.

COMPARATIVE EXAMPLE

A metal-carbon dioxide battery having the structure disclosed in Korean Patent Application No. 10-2021-0136204 was prepared. Zinc was used as an anode and a platinum catalyst supported on a carbon support (Pt/C) was used as a cathode. A 6M KOH solution was employed as a first catalyst, and a 3M $KHCO_3$ solution was employed as a second catalyst. A spacer having a thickness of about 5 mm was used.

Figure 8:
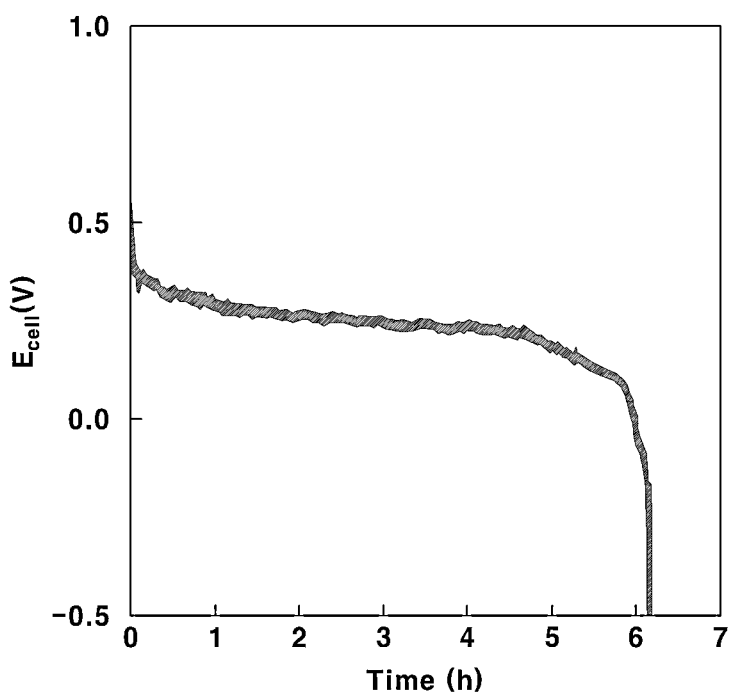
FIG. 8 is a discharge graph of a metal-carbon dioxide battery according to Comparative Example.

FIG. 8 is a discharge graph of the metal-carbon dioxide battery according to Comparative Example. The discharge performance of the metal-carbon dioxide battery was measured at a discharge current density of 50 milliampere per square centimeter (mA/cm 2). Referring to this figure, it may be confirmed that the metal-carbon dioxide battery, according to Comparative Example, needs to be disassembled so as to feed a new anode to the battery after about 6 hours.

Example 1

A metal-carbon dioxide battery having the stack structure shown in FIGS. 2 and 3 was prepared. Zinc foil was used as anode sheets and the thickness of the anode sheets was 0.25 mm. A platinum catalyst supported on a carbon support (Pt/C) was used as a cathode. A 6M KOH solution was employed as a first catalyst, and a 3M $KHCO_3$ solution was employed as a second catalyst. A spacer having a thickness of about 5 mm was used.

At the beginning, one anode sheet was fed, and then, another anode sheet was fed through the opening of the spacer when the former anode sheet was consumed, and thereby, whether or not the battery is capable of being continuously driven was evaluated.

Figure 9:
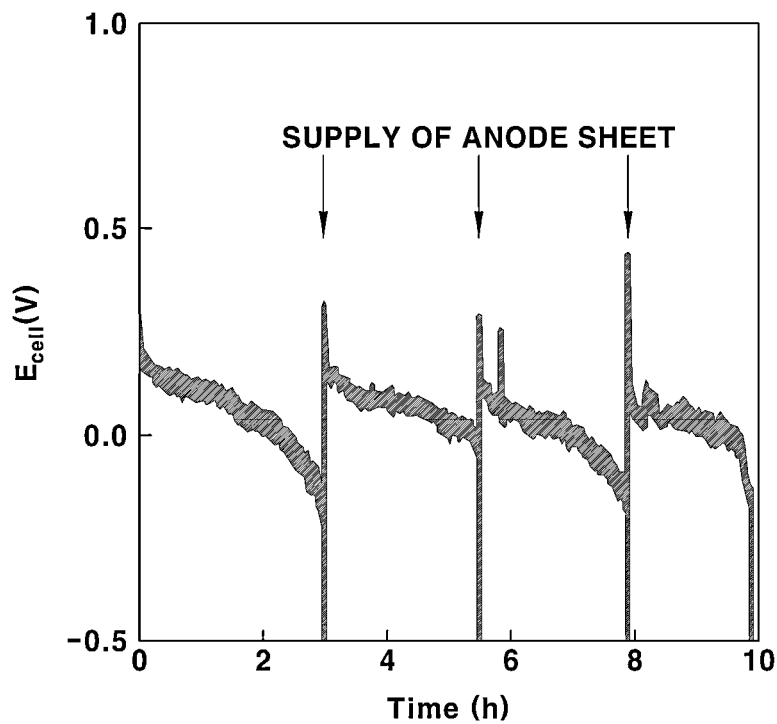
FIG. 9 is a discharge graph of a metal-carbon dioxide battery according to Example 1.

FIG. 9 is a discharge graph of a metal-carbon dioxide battery according to Example 1. The discharge performance of the metal-carbon dioxide battery was measured at a discharge current density of 50 mA/cm 2. Referring to this figure, it may be confirmed that new anode sheets can be continuously fed to the metal-carbon dioxide battery according to Example 1 without disassembling the metal-carbon dioxide battery. This is contrary to the metal-carbon dioxide battery according to Comparative Example. Thus, the metal-carbon dioxide battery according to Example 1 may be driven for a very long time.

Figure 10A:
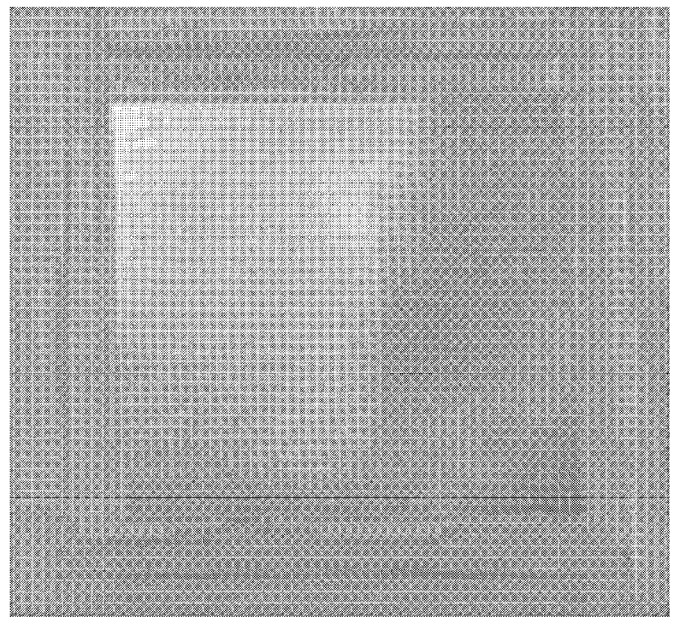
FIG. 10A is an image of an anode sheet provided before driving of the metal-carbon dioxide battery according to Example 1.
Figure 10B:
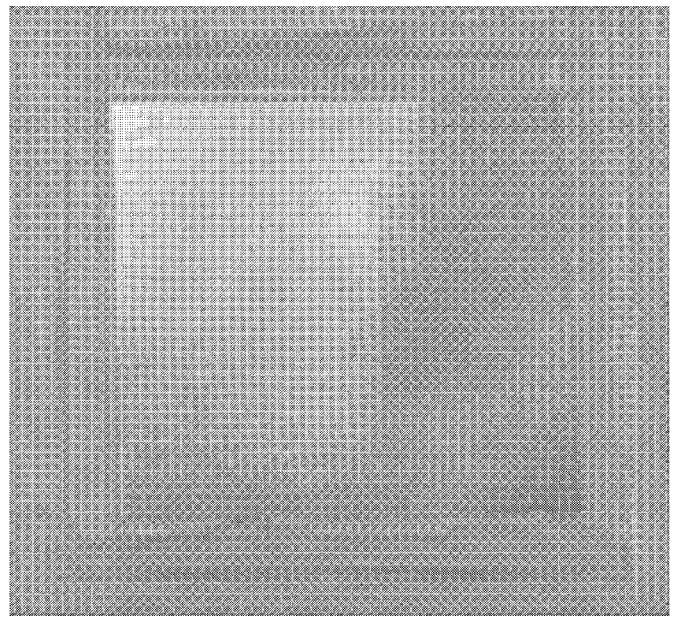
FIG. 10B is an image of the anode sheet after driving of the metal-carbon dioxide battery according to Example 1.

FIG. 10A is an image of an anode sheet provided before driving of the metal-carbon dioxide battery according to Example 1. FIG. 10B is an image of the anode sheet after driving of the metal-carbon dioxide battery according to Example 1. Referring to these figures, it may be confirmed that the surface of the anode sheet was uniformly melted away.

Example 2

A metal-carbon dioxide battery was manufactured in the same manner as in Example 1 except that the thickness of the anode sheets was 1.6 mm.

Figure 11A:
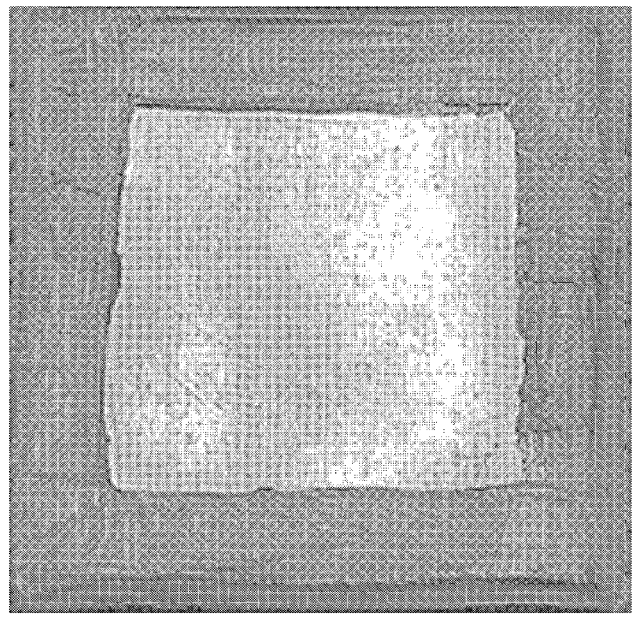
FIG. 11A is an image of an anode sheet provided before driving of a metal-carbon dioxide battery according to Example 2.
Figure 11B:
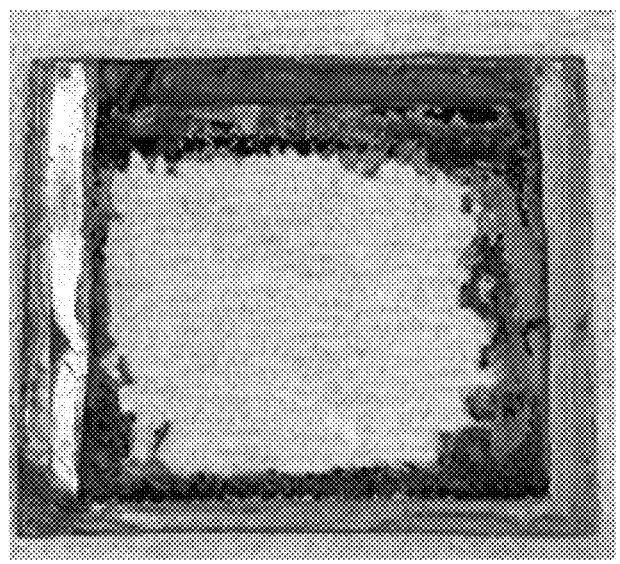
FIG. 11B is an image of the anode sheet after driving of the metal-carbon dioxide battery according to Example 2.

FIG. 11A is an image of an anode sheet provided before driving of the metal-carbon dioxide battery according to Example 2. FIG. 11B is an image of the anode sheet after driving of the metal-carbon dioxide battery according to Example 2. Referring to these figures, it may be confirmed that the surface of the anode sheet was uniformly melted away.

Example 3

A metal-carbon dioxide battery was manufactured in the same manner as in Example 1 except that three anode sheets were stacked.

Figure 12:
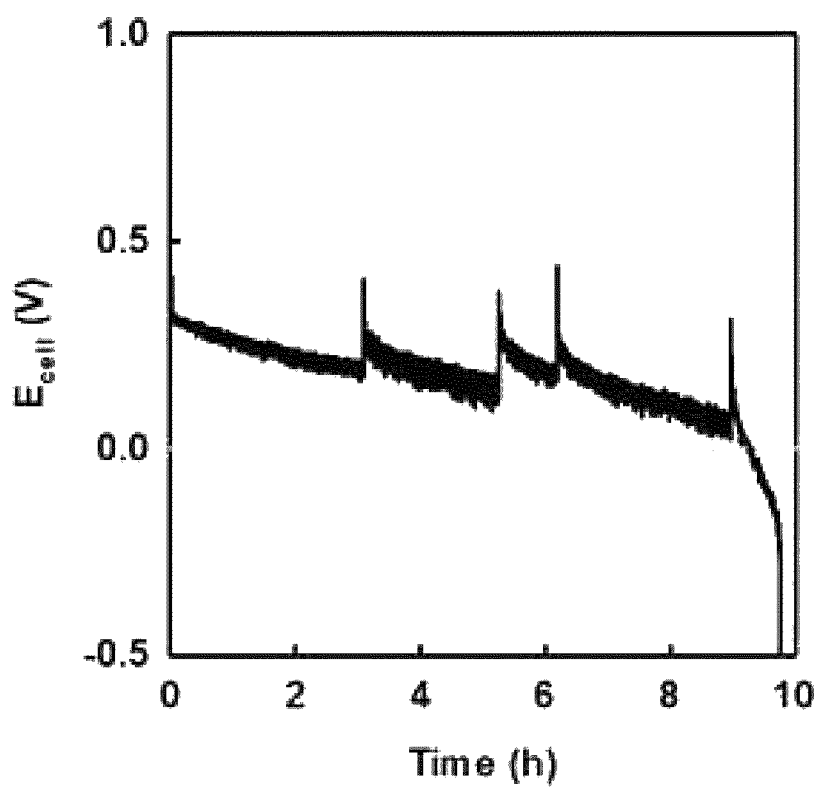
FIG. 12 is a discharge graph of a metal-carbon dioxide battery according to Example 3.
Figure 13:
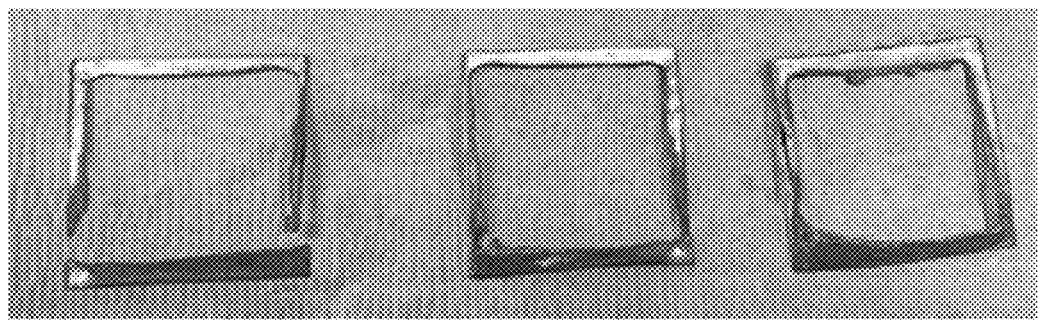
FIG. 13 is an image showing anode sheets after driving of the metal-carbon dioxide battery according to Example 3.

FIG. 12 is a discharge graph of the metal-carbon dioxide battery according to Example 3. The discharge performance of the metal-carbon dioxide battery was measured at a discharge current density of 50 mA/cm 2. FIG. 13 is an image showing anode sheets after driving of the metal-carbon dioxide battery according to Example 3.

Referring to these figures, it may be confirmed that the plural anode sheets were uniformly consumed through reaction sequentially from the anode sheet closest to a separator to the final anode sheet and were uniformly melted away.

As should be apparent from the above description, the present disclosure may provide a metal-carbon dioxide battery, which has a low cell resistance and thus has greatly increased efficiency.

Further, the present disclosure may provide a metal-carbon dioxide battery to which anodes may be continuously fed without disassembling the metal-carbon dioxide battery.

Moreover, the present disclosure may provide a metal-carbon dioxide battery, which is spontaneously driven even when seawater is used as electrolytes of a cathode and an anode.

The inventive concept of the disclosure has been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A metal-carbon dioxide battery comprising:
   a first plate having a designated area;
   a second plate having a designated area and located to be spaced apart from the first plate by a designated distance in an X-axis direction;
   a separator interposed between the first plate and the second plate;
   a spacer having a shape of a frame with a through hole formed through the center thereof and disposed between the first plate and the separator, wherein a space between the first plate and the separator is formed;
   a plurality of anode sheets accommodated in the space;
   a pressing unit accommodated in the space, installed between the first plate and the anode sheets, and providing pressing force so as to move or bias the anode sheets towards the separator; and
   a cathode interposed between the second plate and the separator.

2. The metal-carbon dioxide battery of claim 1, further comprising a first gasket having a shape of a frame and having a designated thickness, wherein the first gasket is interposed between the first plate and the spacer, and wherein the space between the first plate and the separator extends by a thickness of the first gasket.

3. The metal-carbon dioxide battery of claim 1, wherein the spacer comprises:
   a first electrolyte inlet located in a lower portion of one side surface of the spacer so that a first electrolyte is introduced thereinto;
   a first electrolyte outlet located in an upper portion of the one side surface of the spacer so that the first electrolyte is discharged therefrom;
   a first horizontal flow path configured to extend from the first electrolyte inlet to one edge part of the spacer in a Y-axis direction;
   a second horizontal flow path configured to extend from the first electrolyte outlet to the one edge part of the spacer in the Y-axis direction;
   a vertical flow path configured to connect one end of the first horizontal flow path to one end of the second horizontal flow path;
   a first supply flow path formed through some portions of the first horizontal flow path in a Z-axis direction so as to be directed towards a central portion of the spacer; and
   a second supply flow path formed through some portions of the second horizontal flow path in the Z-axis direction so as to be directed towards the central portion of the spacer.

4. The metal-carbon dioxide battery of claim 1, wherein the spacer comprises an opening formed in some regions of an upper portion thereof so as to accommodate the anode sheets.

5. The metal-carbon dioxide battery of claim 4, further comprising a lid installed to be detachably attached to the opening.

6. The metal-carbon dioxide battery of claim 1, wherein the anode sheets are stacked in the X-axis direction and accommodated in the space.

7. The metal-carbon dioxide battery of claim 1, wherein a thickness ratio of the anode sheets to the spacer is in a range of 0.025:1 to 0.5:1.

8. The metal-carbon dioxide battery of claim 1, wherein the anode sheets comprise at least one of zinc (Zn), aluminum (Al), magnesium (Mg), or any combination thereof.

9. The metal-carbon dioxide battery of claim 1, wherein the pressing unit comprises:
   a support plate pressing the anode sheets; and
   an elastic member provided between the support plate and the first plate and providing elastic force to the support plate.

10. The metal-carbon dioxide battery of claim 1, wherein the pressing unit comprises:
    a support plate pressing the anode sheets; and
    a fluid accommodated in a gap between the support plate and the first plate,
    wherein the first plate includes a fluid inlet formed therethrough in the X-axis direction so as to communicate with the gap, and
    wherein the metal-carbon dioxide battery further comprises a fluid supplier supplying the fluid to the gap through the fluid inlet so as to provide fluid pressure to the support plate.

11. The metal-carbon dioxide battery of claim 1, further comprising a protective film having a shape of a plate and interposed between the anode sheets and the separator, wherein the protective film is porous.

12. The metal-carbon dioxide battery of claim 1, wherein the cathode comprises at least one of carbon paper, carbon fiber, carbon felt, carbon fabric, metal foam, a thin metal film, or any combination thereof.

13. The metal-carbon dioxide battery of claim 1, wherein the cathode comprises a precious metal catalyst loaded on a support.

14. The metal-carbon dioxide battery of claim 1, wherein the second plate comprises:
    a body part having a shape of a plate;
    a protrusion part configured to protrude from a central portion of one surface of the body part so as to have an area equal to or smaller than an area of the cathode;
    a second electrolyte inlet formed in the protrusion part so as to penetrate the protrusion part and the body part;
    a second electrolyte outlet spaced apart from the second electrolyte inlet by a designated distance and formed in the protrusion part so as to penetrate the protrusion part and the body part; and
    a second electrolyte flow path depressed from a surface of the protrusion part and provided with one end configured to communicate with the second electrolyte inlet and a remaining end configured to communicate with the second electrolyte outlet.

15. The metal-carbon dioxide battery of claim 14, wherein the cathode comes into direct contact with the protrusion part.

16. The metal-carbon dioxide battery of claim 14, further comprising a second gasket disposed on an outer circumferential surface of the protrusion part.

17. A hydrogen generation and carbon dioxide storage system comprising:
    the metal-carbon dioxide battery according to claim 1, configured to generate hydrogen using carbon dioxide as fuel;
    a first electrolyte supplier configured to supply a first electrolyte to the metal-carbon dioxide battery;
    a second electrolyte supplier configured to supply a second electrolyte and the carbon dioxide to the metal-carbon dioxide battery; and
    a separation unit connected to a second electrolyte outlet of the metal-carbon dioxide battery and configured to receive products of the metal-carbon dioxide battery, to separate hydrogen gas from the products, and to recover carbon dioxide stored in a form of a salt.

18. The hydrogen generation and carbon dioxide storage system of claim 17, the first electrolyte comprises an aqueous alkaline solution or seawater.

19. The hydrogen generation and carbon dioxide storage system of claim 17, the second electrolyte comprises an aqueous alkaline solution or seawater.

* * * * *